US006973086B2

(12) United States Patent
Patil et al.

(10) Patent No.: US 6,973,086 B2
(45) Date of Patent: Dec. 6, 2005

(54) METHOD AND SYSTEM FOR SECURING MOBILE IPV6 HOME ADDRESS OPTION USING INGRESS FILTERING

(75) Inventors: Basavaraj Patil, Coppell, TX (US); Charles E. Perkins, Saratoga, CA (US)

(73) Assignee: Nokia Corporation, Espoo (FI)

( * ) Notice: Subject to any disclaimer, the term of this patent is extended or adjusted under 35 U.S.C. 154(b) by 545 days.

(21) Appl. No.: 10/186,198

(22) Filed: Jun. 28, 2002

(65) Prior Publication Data

US 2003/0142673 A1 Jul. 31, 2003

Related U.S. Application Data

(60) Provisional application No. 60/352,436, filed on Jan. 28, 2002.

(51) Int. Cl.[7] ............................................. H04L 12/28
(52) U.S. Cl. ...................................... 370/392; 370/400
(58) Field of Search ................................ 370/338, 352, 370/432, 351, 349, 401, 389, 390, 400, 524, 370/331, 332, 392

(56) References Cited

U.S. PATENT DOCUMENTS

| | | | |
|---|---|---|---|
| 5,572,528 A | 11/1996 | Shuen | ...................... 370/85.13 |
| 6,172,986 B1 | 1/2001 | Watanuki et al. | ........... 370/466 |
| 6,578,085 B1 * | 6/2003 | Khalil et al. | ................. 709/241 |
| 6,721,297 B2 * | 4/2004 | Korus et al. | ................. 370/338 |

OTHER PUBLICATIONS

Ying Qiu et al, Protecting all traffic channels in mobile IPv6 network, Mar. 21-25, 2004, IEE, vol. 1, pp. 160-165 vol. 1.*
Dell'Uomo et al, The mobility management and authentication/authorization mechanisms in mobile networks beyong 3G, Sep. 30, Oct. 3, 2001, IEEE, vol.: 1, pp. C-44-C-48 vol. 1.*
Chen et al, Mobile IPv6 and AAA architecture based on WLAN, Jan. 26-30, 2004, IEEE, pp. 190-196.*

* cited by examiner

*Primary Examiner*—Chi Pham
*Assistant Examiner*—Alexander O. Boakye
(74) *Attorney, Agent, or Firm*—Darby & Darby P.C.; Thomas R. Marquis

(57) ABSTRACT

The invention provides for disabling communication at the access router on a visited network that supports mobile IP v6 and the home address destination option. Until a home agent or a correspondent node authenticates the home IP address of the mobile node and the access router verifies this address, the mobile node is unable to communicate with other resources over the visited network. If the home IP address included in a binding acknowledgement message is verified by the access router and affirmatively compared to the state of a corresponding binding update message from the mobile node, the access router enables subsequent messages to be communicated over the visited network between the mobile node and other resources.

20 Claims, 5 Drawing Sheets

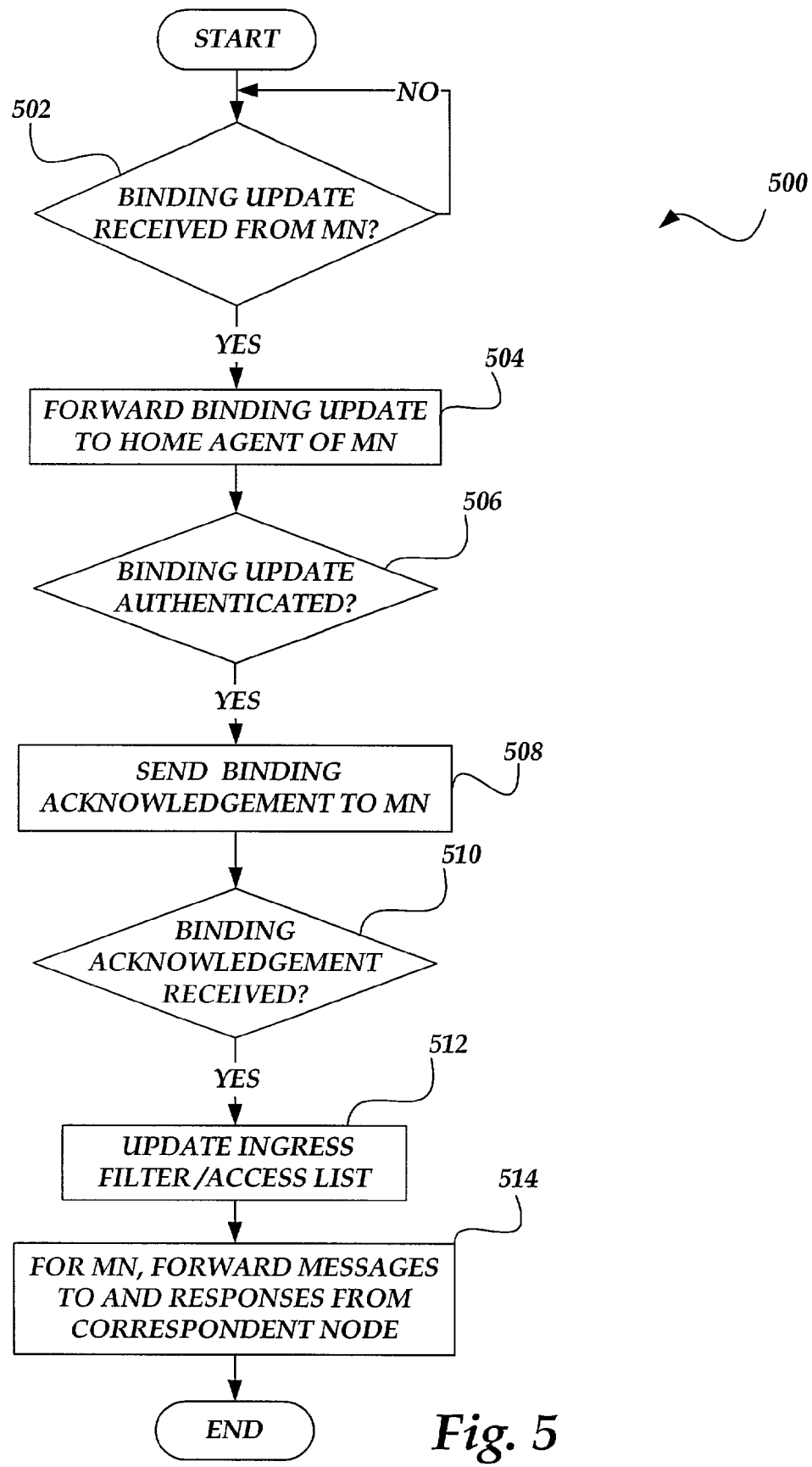

METHOD AND SYSTEM FOR SECURING MOBILE IPV6 HOME ADDRESS OPTION USING INGRESS FILTERING

RELATED APPLICATION

This utility patent application is a continuation of a previously filed U.S. provisional patent application, U.S. Ser. No. 60/352,436 filed on Jan. 28, 2002, the benefit of the filing date of which is hereby claimed under 35 U.S.C. §119(e).

FIELD OF THE INVENTION

The present invention relates to IP mobility for mobile nodes, and more particularly to securing mobile IP home addresses with the mobile IPv6 protocol.

BACKGROUND OF THE INVENTION

Version six (v6) of the mobile IP protocol has been under development by the Internet Engineering Task Force (IETF) since at least 1996. In the process of standardizing the mobile IPv6 protocol, some security issues have been identified regarding its deployment with the home-address destination option.

For example, when a mobile IPv6 node (MN) is away from its home network (on a visiting network) and sends packets to a correspondent node (CN) and the home agent (HA), the visiting network provides a care-of-address (COA) that is used as a source address for each packet instead of the MN's actual home address. The CN may be an access router for content, such as web site. Typically, the HA is an access router on the home network that can authenticate and authorize the MN with a shared secret.

Currently, the mobile Ipv6 protocol's home address destination option (HoA) enables a source address to be a COA for each packet from an MN on a visiting network and the payload for each of these packets to include the home address of the MN. When the packet is received by a CN or HA, they swap the COA in the source address with the MN's home address in the payload of each packet. The packets are then forwarded to other destinations with the "new" source address that identifies the origin of the message, i.e., the MN.

Unfortunately, the home address destination option can be a security threat to the Internet since it is open to misuse. In particular, since it is relatively easy to determine the home IP address for any MN, an attacker could store a particular MN's home IP address in the payloads for packets that are sent in a DoS attack from an unsuspecting node on the Internet. In this scenario, the true origin (IP address) of the attacker would be very difficult to trace in a network that supported the home-address destination option of IPv6.

SUMMARY OF THE INVENTION

In accordance with the invention, a method is provided for securely communicating packets using the home address destination option in a mobile IPv6 protocol network. A care of address is provided to a mobile node that employs an access router to communicate with at least one resource over a visited network. A binding update message from the mobile node is forwarded by the access router to another node for authentication. The other node responds with a binding acknowledgement message to the mobile node if a home IP address included in the binding update message is authentic. If the binding acknowledgement message from the other node is determined by the access router to verify the home IP address for the mobile node, the mobile node can communicate another type of data through the access router with at least one resource over the visited network. However, until the home IP address is verified by the access router, the mobile node is unable to communicate the other type of data with any resource through the access router.

In another aspect of the invention, at least one authentication object in the binding acknowledgement message is provided to enable the access router to verify the home IP address of the mobile node. The authentication object can include at least one of an x.509 certificate, public key, private key or security token.

In yet another aspect of the invention, the binding acknowledgement message is compared to a state of a corresponding binding update message that was previously forwarded to the home agent by the access router. If the comparison is affirmative, the mobile node can communicate through the access router with at least one resource over the visited network so long as the mobile node's home IP address has been verified by the access router.

In still another aspect of the invention, the access router can employ an ingress filter to control communication between the mobile node and at least one resource over the visited network. An access list can also be employed with the access router to control communication between the mobile node and other nodes coupled to the visited network.

In yet further aspects of the invention, the other node can be at least one of a home agent or a correspondent node.

In still further aspects of the invention, each packet for the binding update message, binding acknowledgement message and other type of data include the home address destination option. Also, the other type of data can include at least one of Short Message Service (SMS), signaling, text, code and voice.

In accordance with yet another aspect of the invention, an apparatus, system and computer readable medium may be employed to practice substantially the same actions discussed above for the method.

BRIEF DESCRIPTION OF THE DRAWINGS

FIG. 5 is a flow chart for enabling communication for a Mobile Node on a visited network, in accordance with the invention.

DETAILED DESCRIPTION OF THE PREFERRED EMBODIMENT

Figure 1:
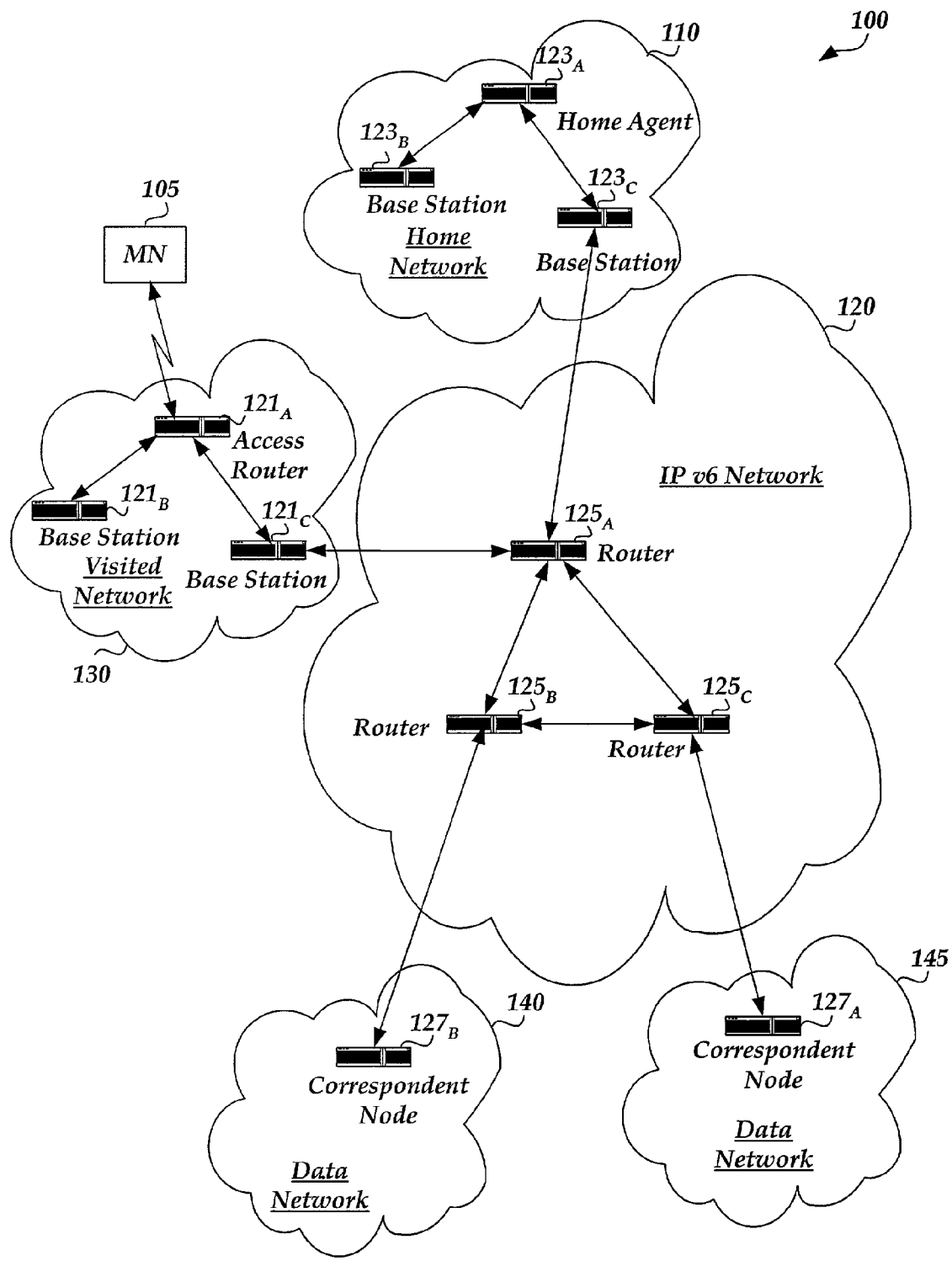
FIG. 1 is a block diagram for an exemplary Mobile IPv6 system.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element that monitors a load for a link within a path. The term "flow" means a flow of IP packets. The term "user" refers to any person or customer such as a business or organization that employs a mobile node to communicate or access resources over a mobile network. The term "operator" refers to any technician or organization that maintains or services an IP packet based network. The term "identifier" includes an MSISDN number, an IP address, or any other information that relates to the location or identity of the user.

The term "router" refers to a dedicated network element that receives IP packets and forwards them to their destination. In particular, a router is used to extend or segment networks by forwarding IP packets from one logical network to another. A router typically operates at layer 3 and below of the Open Systems Interconnection (OSI) reference model for networking. However, some routers can provide additional functionality that operates above layer 3 of the OSI reference model.

Generally, a router is aware of multiple paths that a received IP packet can take to its final destination. Based on the logical address included in a received IP packet, a router will forward the IP packet along an optimal path towards its final destination. Typically, a router contains internal tables of information called routing tables that keep track of all known network addresses and possible paths throughout the internetwork, along with the cost of reaching each logical network. A router optimally routes IP packets based on the available paths and their costs, thus taking advantage of redundant paths that can exist in a mesh topology network. Some routers have static routing tables that must be manually configured with all network addresses and paths in the internetwork. Other routers are capable of automatically/dynamically creating their own routing tables by listening to network traffic.

The term "Mobile Node" refers to a wireless device that changes its point of attachment from one network or subnetwork to another. A mobile node may change its location without losing connectivity and without changing its IP address; it may continue to communicate with other Internet nodes at any location using its (constant) IP address, assuming link-layer connectivity to a point of attachment is available. A mobile node is given a long-term home IP address on a home network. This home address is administered in the same way as a "permanent" IP address is provided to a stationary host. When away from its home network, a "care-of address" is associated with the mobile node and reflects the mobile node's current point of attachment. The mobile node uses its home address as the source address of all IP datagrams that it sends, with some exceptions for datagrams sent for certain mobility management functions. A mobile node can change its point of attachment from one link to another, while still being reachable via its home address.

The term "Home Agent" refers to a router on a mobile node's home network which tunnels packets for delivery to the mobile node when it is away from home, and maintains current location information for the mobile node. A router on a mobile node's home link with which the mobile node has registered its current care-of address. While the mobile node is away from home, the home agent intercepts packets on the home link destined to the mobile node's home address, encapsulates them, and tunnels them to the mobile node's registered care-of address.

The term "Care-of Address" refers to the termination point of a tunnel toward a mobile node, for datagrams forwarded to the mobile node while it is away from home. The protocol can use two different types of care-of address: a "foreign agent care-of address" is an address of a foreign agent with which the mobile node is registered, and a "co-located care-of address" is an externally obtained local address which the mobile node has associated with one of its own network interfaces.

The term "Correspondent Node" refers to a peer with which a mobile node is communicating. A correspondent node may be either mobile or stationary.

The term "Foreign Network" refers to any network other than the mobile node's Home Network.

The term "Home Address" refers to an IP address that is assigned for an extended period of time to a mobile node. It remains unchanged regardless of where the node is attached to the Internet. An IP address that is assigned to a mobile node within its home link.

The term "Home Network" refers to a network, possibly virtual, having a network prefix matching that of a mobile node's home address. Note that standard IP routing mechanisms will deliver datagrams destined to a mobile node's Home Address to the mobile node's Home Network.

The term "Link-Layer Address" refers to the address used to identify an endpoint of some communication over a physical link. Typically, the Link-Layer address is an interface's Media Access Control (MAC) address.

The term "Mobility Agent" refers to either a home agent or a foreign agent.

The term "tunnel" refers to the path followed by a datagram while it is encapsulated. The model is that, while it is encapsulated, a datagram is routed to a knowledgeable decapsulating agent, which decapsulates the datagram and then correctly delivers it to its ultimate destination.

The term "Virtual Network" refers to a network with no physical instantiation beyond a router (with a physical network interface on another network). The router (e.g., a home agent) generally advertises reachability to the virtual network using conventional routing protocols.

The term "Visited Network" refers to a network other than a mobile node's Home Network, to which the mobile node is currently connected.

The term "Visitor List" refers to the list of mobile nodes visiting a foreign agent.

Referring to the drawings, like numbers indicate like parts throughout the views. Additionally, a reference to the singular includes a reference to the plural unless otherwise stated or is inconsistent with the disclosure herein.

The invention provides a mechanism for ingress filtering at access routers that provide access to mobile IPv6 networks, the Internet in general and support IP mobility. A mobile node's care-of-address is based on the access router/default router/foreign agent that it is connected to on a visited network. Ingress filtering is a technique by which access routers and firewalls determine what traffic is allowed to pass (forward). Security for the use of the home address destination option is improved with the installation of appropriate ingress filters at access routers for visited networks that the MN may be connected to. Until a home IP address claimed by the MN is authenticated by the HA or CN, the ingress filtering at an access router on a visited network would disallow the forwarding of packets from the MN that contain the home address destination option.

Using the invention, when a mobile node first connects to an access point (router) on a visiting network, it obtains a new care-of-address (COA) and sends a binding update message to the HA on its home network or a CN. The access router (first hop router/default router) on the visited network allows this message from the MN to be forwarded, which includes the home-address destination option, because it is a binding update message.

When a binding acknowledgement (Ack) message is received from the HA or a CN in response to the binding update message, the access router validates the home address for use by the MN in further communication with the HA and CNs. Also, the access router adds the MN's home address to the ingress filter (or access control list). In this way, subsequent packets/messages sent by the MN with the home-address destination option would be viewed by the ingress filter as topologically correct, and as a result, they would be forwarded towards their destination. In one embodiment, access control or ingress filtering at the access router could also be done with some combination of the care-of-address and home IP address.

In another embodiment, the HA or the CN could add a certificate or similar token to the binding acknowledgment message for further authenticating and/or authorizing the home IP address claimed by an MN coupled to a visiting network. In this case, the certificate/token, could be stripped off the message by the access router before it is forwarded to the MN.

By employing this additional authorization along with ingress filtering, an access router does not allow packets with the home address destination option to be sent to the Internet without first checking that the MN has been authenticated, presumably by its home agent. As a result, the threat of Denial of Service (DoS) attacks and packet reflector attacks using the mobile IPv6 protocol can be greatly diminished.

Illustrative Operating Environment

With reference to FIG. 1, an exemplary mobile IPv6 network in which the invention may operate is illustrated. As shown in the figure, mobile IPv6 network 100 includes mobile node (MN) 105, home network 110 which is a radio access network (RAN), IPv6 network 120, base stations $123_{A-C}$, ($123_A$ also operates as a Home Agent for MN 105), routers $125_{A-C}$, routers (correspondent nodes) $127_{A-B}$, data networks 140 and 145, visited network 130 (which is another RAN), and base stations $121_{A-C}$ ($121_A$ also operates as an access router and foreign agent on visited network 130 for MN 105).

The connections and operation for mobile IP network 100 will now be described. Generally, MN 105 may include any device capable of connecting to a wireless network such as home network 110 and visited network 130. Such devices include cellular telephones, smart phones, pagers, radio frequency (RF) devices, infrared (IR) devices, integrated devices combining one or more of the preceding devices, and the like. Mobile Node 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Home network 110 manages radio resources and provides mobile nodes with a mechanism to access IPv6 network 120.

Home network 110 transports information to and from devices capable of wireless communication, such as mobile node 105. Home network 110 may include both wireless and wired telecommunication components. For example, home network 110 may include a cellular tower and/or base stations that are linked to a wired telecommunication network. Typically, the cellular tower/base station carries wireless communication to and from mobile devices such as cell phones, pagers, and other wireless devices, and the wired telecommunication network carries communication to regular phones, long-distance communication links, and the like. As shown in the figure, home network 110 includes base stations $123_{A-C}$ and base station $123_A$ is illustrated operating as a home agent for MN 105.

Visited network 130 manages radio resources and provides mobile nodes with a mechanism to access mobile IPv6 network 120. Mobile Node 105 is in communication with base station (access router) $121_A$ on visited network 130, which includes several base stations $121_{A-C}$ that are in communication with each other and MN 105. Visited network 110 may include both wireless and wired telecommunication components.

In one embodiment, one or more of base stations $121_{A-C}$ and $123_{A-C}$ may have router functionality. Although not shown, Radio Network Controllers (RNCs) may also be included in home network 110 and visited network 130 and also provide router functionality.

IPv6 network 120 is an IP packet based backbone network such as the Internet that supports the Mobile IPv6 protocol and includes many routers, such as exemplary routers $125_{A-C}$, to connect the support nodes in the network. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

Routers $125_{B-C}$ couple IPv6 network 120 to data networks 140 and 145 at routers (correspondent nodes) $127_{A-B}$. Routers/correspondent nodes $127_{A-B}$ provide access to data networks 140 and 145 for MN 105.

Mobile IP network 100 may include many more components than those shown in FIG. 1. However, the components shown are sufficient to disclose an illustrative embodiment for practicing the present invention. The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
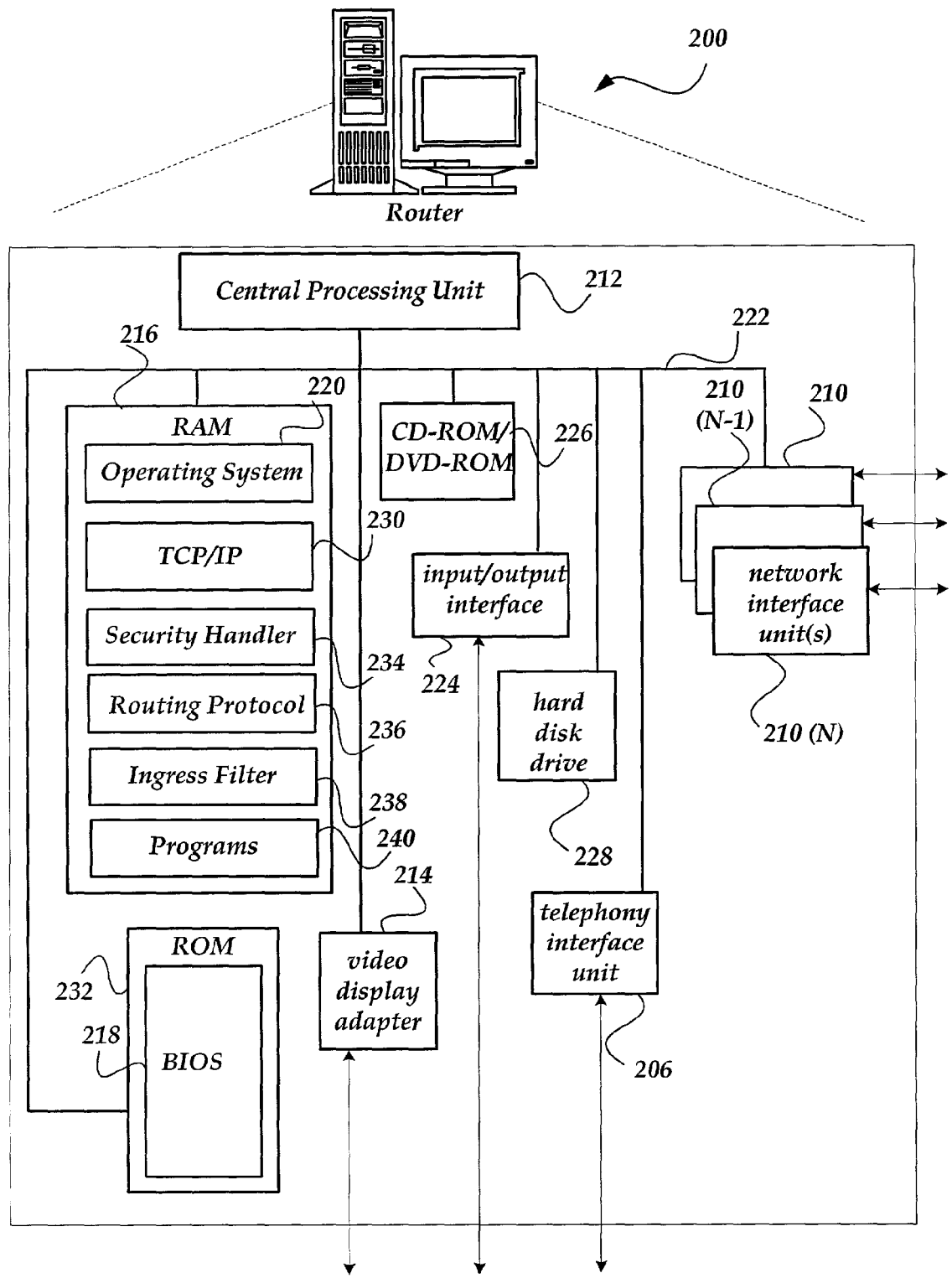
FIG. 2 is a schematic diagram for an exemplary Access Router.

FIG. 2 is a schematic diagram that shows an exemplary router 200 for use in a mobile IP network. Router 200 may include many more components than those shown in FIG. 2. However, the components shown are sufficient to disclose an illustrative embodiment for practicing the present invention.

As shown in FIG. 2, router 200 is connected to a mobile IP network, or other IP based communications network, via network interface unit(s) 210. Network interface unit(s) 210 includes the necessary circuitry for connecting router 200 to a mobile IP network, and is constructed for use with various communication protocols including the COPS protocol that runs on top of TCP. Other communications protocols may be used, including, for example, UDP protocols. Often, network interface unit(s) 210 is implemented with an electronic card contained within router 200. Typically, there is one network interface unit 210 provided for each network connection to router 200. Also, network interface unit 210 may provide a wireless connection to a mobile node.

Additionally, telephony interface unit 206 may be provided to couple router 200 to core network 120. Telephony interface unit 206 may be configured to operate as a modem over an analog telephone line, e.g., a plain old telephone system (POTS) line. Alternatively, telephony interface unit 206 may be arranged to operate as a modem over a digital telephone line, e.g., a digital subscriber line (DSL) or an integrated services digital network (ISDN) telephone line.

Router 200 also includes processing unit 212, optional video display adapter 214, and a mass memory, all connected via bus 222. The mass memory generally includes RAM 216, ROM 232, and optionally, one or more permanent mass storage devices, such as hard disk drive 228, a tape drive, CD-ROM/DVD-ROM drive 226, and/or a floppy disk drive. The mass memory stores operating system 220 for controlling the operation of router 200. This component may comprise a general purpose operating system 220 as is known to those of ordinary skill in the art, such as UNIX, LINUX™, Microsoft WINDOWS NT®, and the like. Alternatively, the operating system may be specialized to support routing functions, such as the AmbOS® operating system provided by Nokia, Inc. Basic input/output system ("BIOS") 218 is also provided for controlling the low-level operation of router 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for a Transmission Control Protocol/Internet Protocol (TCP/IP) 230, Security Handler 234, and Routing protocol 236, Ingress Filter application 238, and other programs 240. TCP/IP 230, Security Handler 234, and Routing Protocol 236 include computer executable instructions which, when executed by router 200, assist in providing security and forwarding a flow of packets from a connection towards a destination such as a correspondent node. Also, Routing Protocol 236 may include Routing Information Protocol (RIP), Open Shortest Path First (OSPF), Border Gateway Protocol (BGP), Classless Inter-Domain Routing (CIDR), Simple Network Management Protocol (SNMP), and the like.

Although not shown, router 200 may include a JAVA virtual machine, an HTTP handler application for receiving and handing HTTP requests and JAVA applets for transmission to a WWW browser executing on a mobile node. Security Handler 234 may include an IPsec handler, a Transport Layer Security (TLS) handler and/or an HTTPS handler application for handling secure connections. Either the IPsec handler or the TLS handler may be used to provide security protection for the COPS protocol. HTTPS handler application may be used for communication with external security applications (not shown), to send and receive private information in a secure fashion.

Router 200 may also comprise an input/output interface 224 for communicating with external devices, such as a mouse, keyboard, scanner, or other input devices not shown in FIG. 2A. Likewise, router 200 may further comprise additional mass storage facilities such as CD-ROM/DVD-ROM drive 226 and hard disk drive 228. Hard disk drive 228 can be utilized by router 200 to store, among other things, application programs, databases, and data.

Figure 3:
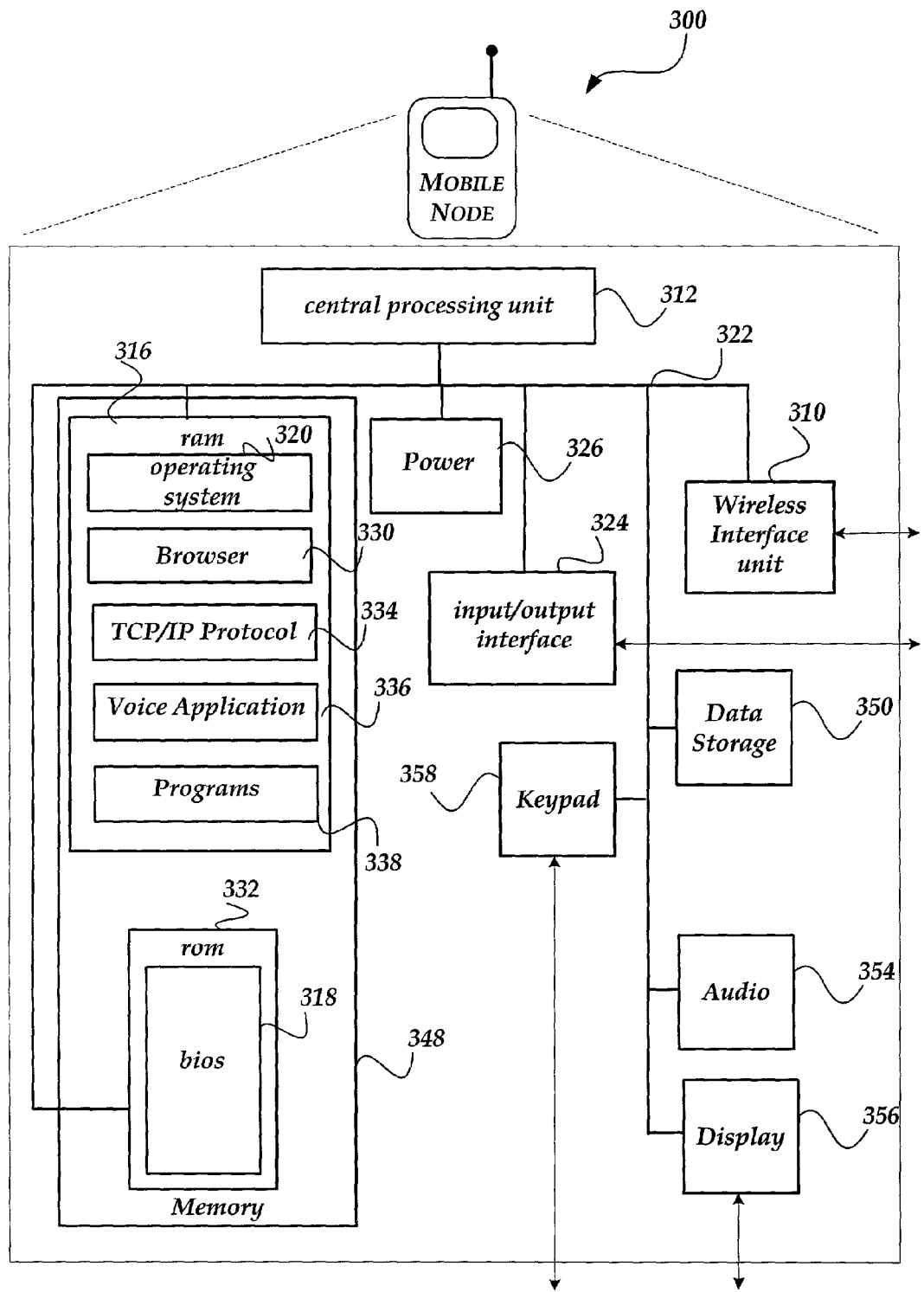
FIG. 3 is a schematic diagram for an exemplary Mobile Node.

FIG. 3 shows an exemplary mobile node 300, according to one embodiment of the invention. Mobile node 300 may be arranged to transmit and receive data arranged in packets. For instance, mobile node 300 may send and receive packets for communicating with other mobile nodes and correspondent nodes. The communication of packets may take place, in whole or in part, over a mobile IP network, Local Area Network (LAN), Wide Area Network (WAN), Internet, and the like.

Mobile node 300 may include many more components than those shown in FIG. 3. However, the components shown are sufficient to disclose an illustrative embodiment for practicing the present invention. As shown in the figure, mobile node 300 includes processing unit 312, memory 348, RAM 316, ROM 332, operating system 320, application 330, TCP/IP Protocol 334, data storage 336, BIOS 318, power 326, input/output interface 324, wireless interface unit 310, audio 354, display 356, and keypad 358.

Mobile node 300 may connect to a mobile network, via wireless interface unit 310, which is constructed for use with various communication protocols including TCP/IP protocol 334. Wireless interface unit 310 may include a radio layer (not shown) that is arranged to transmit and receive radio frequency communications. Wireless interface unit 310 connects mobile device 300 to external devices, via a communications carrier or service provider.

Mass memory 348 generally includes RAM 316, ROM 332, voice application 336, and other programs 338. The mass memory stores operating system 320 for controlling the operation of mobile node 300. It will be appreciated that this component may comprise a general purpose server operating system as is known to those of ordinary skill in the art, such as a version of UNIX, LINUX™, MICROSOFT WINDOWS®, or SYMBIAN®. Basic input/output system ("BIOS") 318 is also provided for controlling the low-level operation of mobile node 300.

Data storage 350 may include various types of media including, but not limited to, volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the mobile node.

The mass memory also stores program code and data used within mobile node 300. More specifically, the mass memory stores applications when executed by mobile node 300, transmit and receive WWW pages, e-mail, voice, streaming audio, video, and the like. One or more programs may be loaded into memory 348 and run under control of operating system 320. Mobile node 300 also includes ROM 332, which can be used to store data that is not lost when the mobile node loses power or is turned off.

Mobile node 300 also comprises input/output interface 324 for communicating with external devices, such as headsets, keyboards, pointers, controllers, modems, and the like. Data storage 350 is utilized by mobile node 300 to store, among other things, applications, databases and data.

Keypad 358 may be any input device arranged to receive inputs from a user. For example, keypad 358 may be a push button numeric dialing, or a keyboard. Display 356 may be a liquid crystal display, or any other type of display commonly used in mobile devices. Display 356 may also be a touch screen arranged to receive a users inputs. Power supply 326 provides power to mobile node 300. According to one embodiment, power from power supply 326 is provided by a rechargeable battery. The power may be also be provided by an external power source, such as an AC adapter or a powered docking cradle that supplements or recharges a battery.

Mobile node 300 as shown includes audio interface 354, which is arranged to receive and produce sounds, i.e., audio signals. For example, audio interface 354 may be coupled to a speaker and microphone (not shown) to enable audio communication for a telephone call.

Illustrative Method

Figure 4:
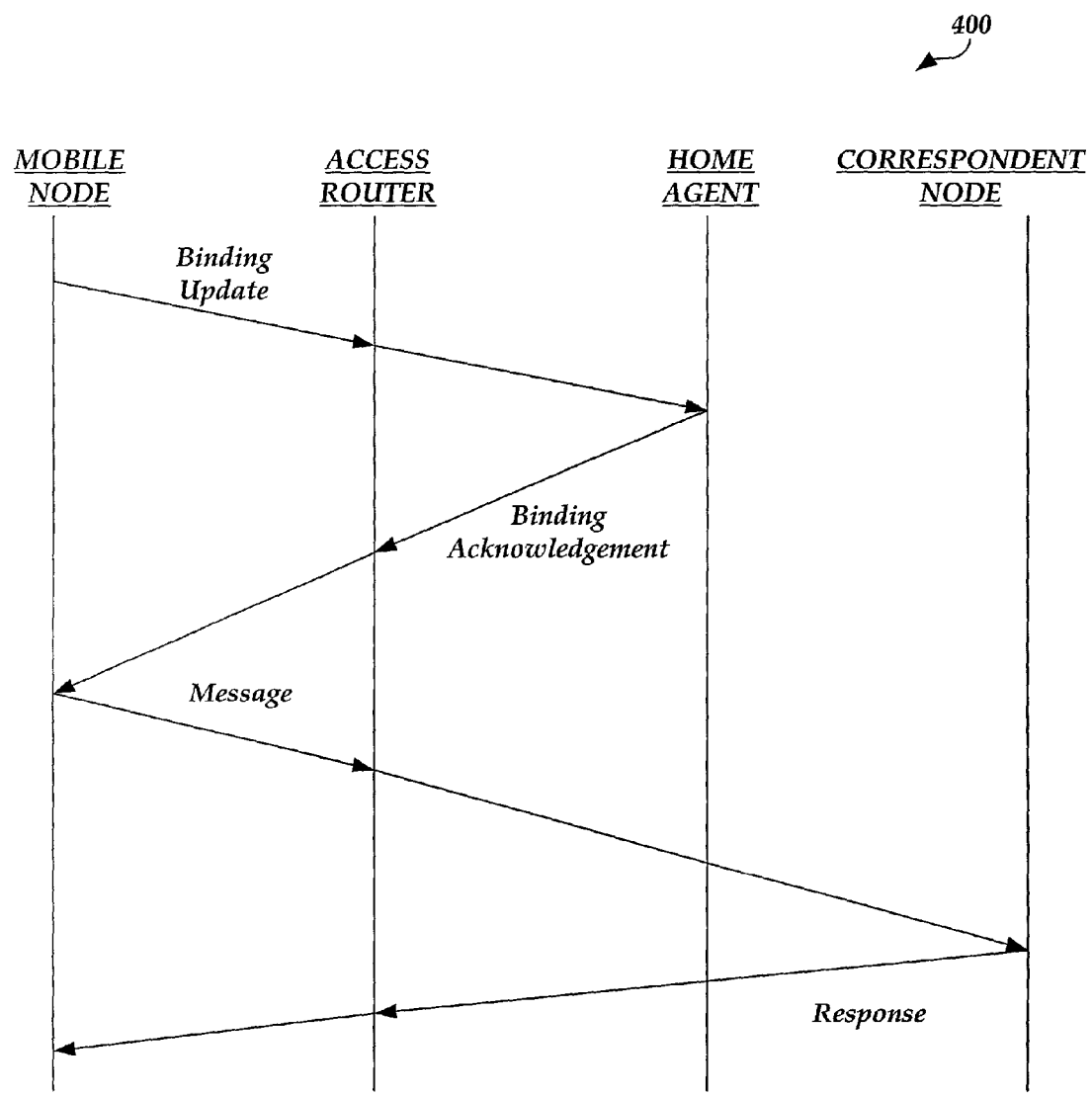
FIG. 4 is a schematic diagram of communication flow between a Mobile Node, Home Agent, Correspondent Node and Access Router on a visited network.

FIG. 4 illustrates overview diagram 400 for the flow of communication between a Mobile Node, Access Router, Home Agent and Correspondent Node for securing the authenticity of packets communicated over a visited network.

From the visited network, the Mobile Node sends a packetized binding update message that includes the home address destination option to the Home Agent logically disposed on the Mobile Node's home network. At the first hop, an Access Router, which has ingress filtering turned on, receives the binding update message from the Mobile Node and determines if the home address destination option is enabled in the corresponding packets. Each packet that is part of the binding update message, and which also includes the home address destination option, is automatically forwarded by the Access Router towards their destination, i.e, the Home Agent. Also, the Access Router maintains the state for this binding update message and waits for a corresponding binding acknowledgment message to be received.

Next, the Home Agent receives the binding update message forwarded by the Access Router. The Home Agent determines if the included home IP address for the Mobile Node is authentic and/or authorized. If not, the Home Agent does not reply to the binding update message. However, when the home IP address included in the binding update message from the Mobile Node can be authenticated/authorized, the Home Agent sends a binding acknowledgement message to the Mobile Node that includes the home address destination option. Depending on the embodiment, the binding acknowledgement message may also include an x.509 certificate, security token, public key, private key and the like.

When the Access Router receives the binding acknowledgement message from the Home Agent, it verifies the validity of the home IP address by examining a certificate/security token included in the message. The Access Router also compares the binding acknowledgement message to the state of a previously forwarded binding update message from the Mobile Node. If there is an affirmative match and the home IP address is verifiable, the Access Router adds the Mobile Node's home IP address to its ingress filter and/or access control list.

Thereafter, when the Mobile Node subsequently sends other types of data/messages whose packets include the home address destination option to a Node over the visited network, the Access Router will determine if the Mobile Node's care of address and/or home IP address is included in the ingress filter and/or an access control list. If true, the packets are forwarded by the Access Router towards its destination. Additionally, if a binding acknowledgement message had not been received matching the corresponding state of the previously forwarded binding update message, the Access Router would not have found a matching entry in the ingress filter and/or access control list. In this case, the Access Router would not forward other types of data/messages to other nodes coupled to the visited network. Additionally, the other type of data can include Short Message Service (SMS), signaling, text, code and voice.

FIG. 5 illustrates a flow chart for a process that enables an Access Router to securely enable a Mobile Node (MN) to communicate with nodes on a network. Moving from a start block to decision block 502, a determination is made as to whether or not a message received by an Access Router is a binding update message that includes the home address destination option. If not, the process loops back and waits for such a message from a Mobile Node. However, if the determination is true, the process advances to a block 504 where the Access Router forwards the binding update message to the Home Agent for the Mobile Node.

Next, at decision block 506, the Home agent receives the forwarded binding update message and determines if the home IP address is authentic and/or authorized. If false, the process jumps to the end block and returns to processing other actions. However, if the determination is affirmative, then the process steps to block 508 where a binding acknowledgement message is sent to the Mobile Node. At block 510, the Access Router receives the binding acknowledgement message from the Home Agent where it verifies the validity of the home IP address included in the message. Also, the Access Router compares the binding acknowledgement message to the state of the previously forwarded binding update message. If false, the process jumps to the end block and returns to processing outer actions. However, if the determination is true, the process moves to block 512 where the Access Router's ingress filter and/or access list is updated with an entry for the care of address and/or home IP address of the Mobile Node. Also, the binding acknowledgement message is forwarded to the Mobile Node.

Moving to block 514, each subsequent packet for other types of data from the Mobile Node that includes the home address destination option is forwarded by the Access Router to its destination (node) on the network.

Although the discussion of FIGS. 4 and 5 indicate that a Home Agent is employed to authenticate a home IP address of a Mobile Node, in another embodiment, a Correspondent Node may also be used for authenticating this address instead of the Home Agent.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for securely communicating packets that include the home address destination option in a mobile IPv6 protocol network, comprising:
   (a) providing a care of address to a mobile node that employs an access router to communicate with at least one resource over a visited network;
   (b) enabling a binding update message from the mobile node to be forwarded by the access router to another node for authentication, wherein the other node sends a binding acknowledgement message to the mobile node if a home IP address included in the binding update message is authentic; and
   (c) if the binding acknowledgement message from the other node is determined by the access router to verify the home IP address for the mobile node, enabling the mobile node to communicate another type of data through the access router with at least one resource over the visited network, wherein until the home IP address is verified by the access router, the mobile node is unable to communicate the other type of data through the access router.

2. The method of claim 1, further comprising including at least one authentication object in the binding acknowledgement message to enable the access router to verify the home IP address of the mobile node.

3. The method of claim 2, wherein the authentication object includes at least one of an x.509 certificate, public key, private key or security token.

4. The method of claim 1, further comprising comparing the binding acknowledgement message to a state of the binding update message that was previously forwarded to the home agent by the access router, wherein if the comparison is affirmative and the home IP address is verified, enabling the mobile node to communicate other data through the access router with at least one resource over the visited network.

5. The method of claim 1, further comprising employing an ingress filter with the access router to determine whether to forward other data communicated by the mobile node towards at least one resource over the visited network.

6. The method of claim 1, further comprising employing an access list with the access router to determine whether to forward other data communicated by the mobile node towards at least one resource over the visited network.

7. The method of claim 1, wherein the other node is at least one of a home agent or a correspondent node.

8. The method of claim 1, wherein each packet for the binding update message, binding acknowledgement message and other type of data include the home address destination option.

9. The method of claim 1, wherein the other type of data includes at least one of Short Message Service (SMS), signaling, text, code and voice.

10. A system for securely communicating packets that include the home address destination option in a mobile IPv6 protocol network, comprising:
    (a) a destination for packets sent over a network; and
    (b) a mobile node that performs actions, including:
        (i) receiving a care of address that employs an access router to communicate with at least one resource over a visited network;
        (ii) enabling a binding update message from the mobile node to be forwarded by the access router to another node for authentication, wherein the other node sends a binding acknowledgement message to the mobile node if a home IP address included in the binding update message is authentic; and
        (iii) if the binding acknowledgement message from the other node is determined by the access router to verify the home IP address for the mobile node, enabling the mobile node to communicate another type of data through the access router with at least one resource over the visited network, wherein until the home IP address is verified by the access router, the mobile node is unable to communicate the other type of data through the access router.

11. The system of claim 10, wherein each packet for the binding update message, binding acknowledgement message and other type of data include the home address destination option.

12. The system of claim 10, wherein the other type of data includes at least one of Short Message Service (SMS), signaling, text, code and voice.

13. The system of claim 10, further comprising comparing the binding acknowledgement message to a state of the binding update message tat was previously forwarded to the home agent by the access router, wherein if the comparison is affirmative, enabling the mobile node to communicate through the access router with at least one resource over the visited network.

14. An apparatus for securely communicating packets using the home address destination option in a mobile IPv6 protocol network, comprising:
    (a) a network interface tat sends and receives packetized messages; and
    (b) a transcoder that performs actions, including:
        (i) enabling a care of address to be provided to a mobile node that employs an access router to communicate with at least one resource over a visited network;
        (ii) enabling a binding update message from the mobile node to be forwarded by the access router to another node for authentication, wherein the other node sends a binding acknowledgement message to the mobile node if a home IP address included in the binding update message is authentic; and
        (iii) if the binding acknowledgement message from the other node is determined by the access router to verify the home IP address for the mobile node, enabling the mobile node to communicate another type of data through the access router with at least one resource over the visited network, wherein until the home IP address is verified by the access router, the mobile node is unable to communicate the other type of data through the access router.

15. The apparatus of claim 14, wherein the access router is operative as at least one of a default router, first hop router, and wireless base station.

16. The apparatus of claim 14, wherein the mobile node includes at least one of a wireless telephone, pager, radio frequency (RF) devices, Personal Digital Assistant, hand-held computer, personal computer, multiprocessor system, network PC, and wearable computer.

17. The apparatus of claim 14, further comprising including at least one authentication object in the binding acknowledgement message to enable the access router to verify the home IP address of the mobile node.

18. The apparatus of claim 14, further comprising comparing the binding acknowledgement message to a state of the binding update message that was previously forwarded to the home agent by the access router, wherein if the comparison is affirmative, enabling the mobile node to communicate through the access router with at least one resource over the visited network.

19. A computer-readable medium that includes instructions for performing actions, including:
(a) providing a care of address to a mobile node that employs an access router to communicate with at least one resource over a visited network;
(b) enabling a binding update message from the mobile node to be forwarded by the access router to another node for authentication, wherein the other node sends a binding acknowledgement message to the mobile node if a home IP address included in the binding update message is authentic; and
(c) if the binding acknowledgement message from the other node is determined by the access router to verify the home IP address for the mobile node, enabling the mobile node to communicate through the access router with at least one resource over the visited network, wherein until the home IP address is verified by the access route; the mobile node is unable to communicate with any resource through the access router.

20. A method for securely communicating packets using the home address destination option in a mobile IPv6 protocol network, comprising:
(a) means for providing a care of address to a mobile node that employs an access router to communicate with at least one resource over a visited network;
(b) means for enabling a binding update message from the mobile node to be forwarded by the access router to another node for authentication, wherein the other node sends a binding acknowledgement message to the mobile node if a home IP address included in the binding update message is authentic; and
(c) if the binding acknowledgement message from the other node is determined by the access router to verify the home IP address for the mobile node, means for enabling the mobile node to communicate through the access router with at least one resource over the visited network, wherein until the home IP address is verified by the access router, the mobile node is unable to communicate with any resource through the access router.

* * * * *

UNITED STATES PATENT AND TRADEMARK OFFICE
CERTIFICATE OF CORRECTION

PATENT NO. : 6,973,086 B2
DATED : December 6, 2005
INVENTOR(S) : Basavaraj Patil et al.

It is certified that error appears in the above-identified patent and that said Letters Patent is hereby corrected as shown below:

Title page,
Item [56], References Cited, OTHER PUBLICATIONS,
"Ying Qiu et al," reference, delete "et al," and insert -- et al., --.
"Dell'Uomo et al," reference, delete "et al," and insert -- et al., --; delete "beyong" and insert -- beyond --.
"Chen et al," reference, delete "et al," and insert -- et al., --.
Item [57], ABSTRACT,
Line 2, delete "IP v6" and insert -- IPv6 --.

Drawings,
Sheet 1, Fig. 1, Block 120, delete "IP v6 Network" and insert -- IPV6 Network --.
Sheet 3, Fig. 3, Box 316, delete "ram" and insert -- RAM --.
Sheet 3, Fig. 3, Box 332, delete "rom" and insert -- ROM --.
Sheet 3, Fig. 3, Box 318, delete "bios" and insert -- BIOS --.

Column 1,
Line 36, delete "Ipv6" and insert -- IPv6 --.

Column 12,
Lines 24 and 32, delete "tat" and insert -- that --.

Column 13,
Line 23, delete "route;" and insert -- router --.

Signed and Sealed this

Fourteenth Day of March, 2006

JON W. DUDAS
*Director of the United States Patent and Trademark Office*